United States Patent [19]

Sailer

[11] Patent Number: 5,189,544
[45] Date of Patent: Feb. 23, 1993

[54] BIDIRECTIONAL LIGHT WAVEGUIDE TELECOMMUNICATION SYSTEM

[75] Inventor: Heinrich Sailer, Hausham, Austria

[73] Assignee: Siemens Aktiengesellschaft, Munich, Fed. Rep. of Germany

[21] Appl. No.: 759,166

[22] Filed: Sep. 13, 1991

[30] Foreign Application Priority Data

Sep. 14, 1990 [EP] European Pat. Off. ........ 90117771.7

[51] Int. Cl.⁵ ............................................. H04B 10/00
[52] U.S. Cl. ..................................... 359/153; 359/114; 359/124; 359/187
[58] Field of Search ............... 359/152, 153, 113, 114, 359/187, 124

[56] References Cited

U.S. PATENT DOCUMENTS

| | | | |
|---|---|---|---|
| 4,061,577 | 12/1977 | Bell | 250/199 |
| 4,726,010 | 2/1988 | Ali et al. | 370/3 |
| 5,077,619 | 12/1991 | Toms | 359/187 |

FOREIGN PATENT DOCUMENTS

| | | | |
|---|---|---|---|
| 0193190 | 9/1986 | European Pat. Off. | |
| 0313738 | 5/1989 | European Pat. Off. | |
| 3010802 | 9/1981 | Fed. Rep. of Germany | |
| 255459 | 4/1988 | Fed. Rep. of Germany | |
| 3822803 | 5/1989 | Fed. Rep. of Germany | |
| 0141838 | 8/1984 | Japan | 359/153 |
| 59-216335 | 12/1984 | Japan | |
| 0012138 | 1/1986 | Japan | 359/153 |
| 2110498 | 6/1983 | United Kingdom | |
| 2144598 | 5/1985 | United Kingdom | |

OTHER PUBLICATIONS

"Optical Transceivers", pp. 551-585.
"Optical Fibres" EPO Applied Technology Series, vol. 5, 1986, pp. 552-586.
Soejima et al., "Experimental Optical Ping-Pong Transmission System", Zürich Seminar, 1986, Conf. paper B3, pp. B3.1-B3.8.
Althaus et al., "Laser-Sendemodul für die Einmoden-Lichtwellenleitertechnik", Telcom Report, vol. 10, 1987, pp. 146-150.

*Primary Examiner*—Edward L. Coles, Sr.
*Assistant Examiner*—L. Pascal
*Attorney, Agent, or Firm*—Hill, Steadman & Simpson

[57] ABSTRACT

In a bidirectional light waveguide telecommunication system comprising telecommunication equipment that each respectively comprise a laser module whose monitor diode is also used as a receiving diode, the telecommunication equipment work in frequency-division multiplex in which a modulation circuit that precedes the laser transmitting diode converts the electrical transmission signal into a frequency band other than the frequency band occupied by the electrical reception signal. A frequency separating filter that follows the monitor diode is then connected, first of all, to a reception signal demodulator and, secondly, to a control circuit for setting the operating point of the laser transmitting diode.

2 Claims, 2 Drawing Sheets

FIG 1
TELECOMMUNICATION EQUIPMENT
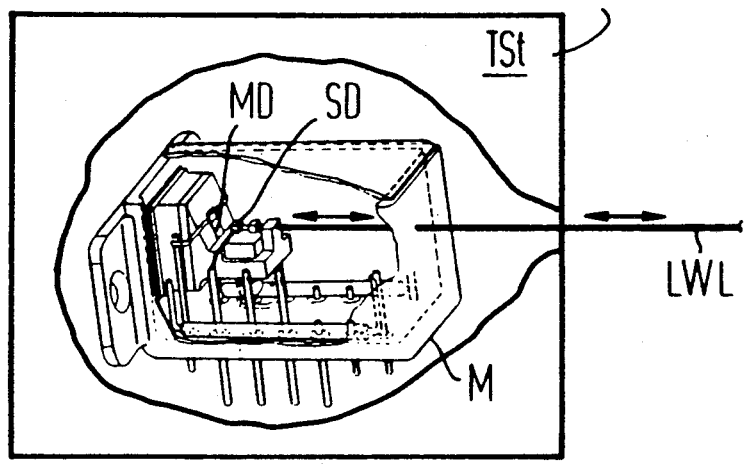
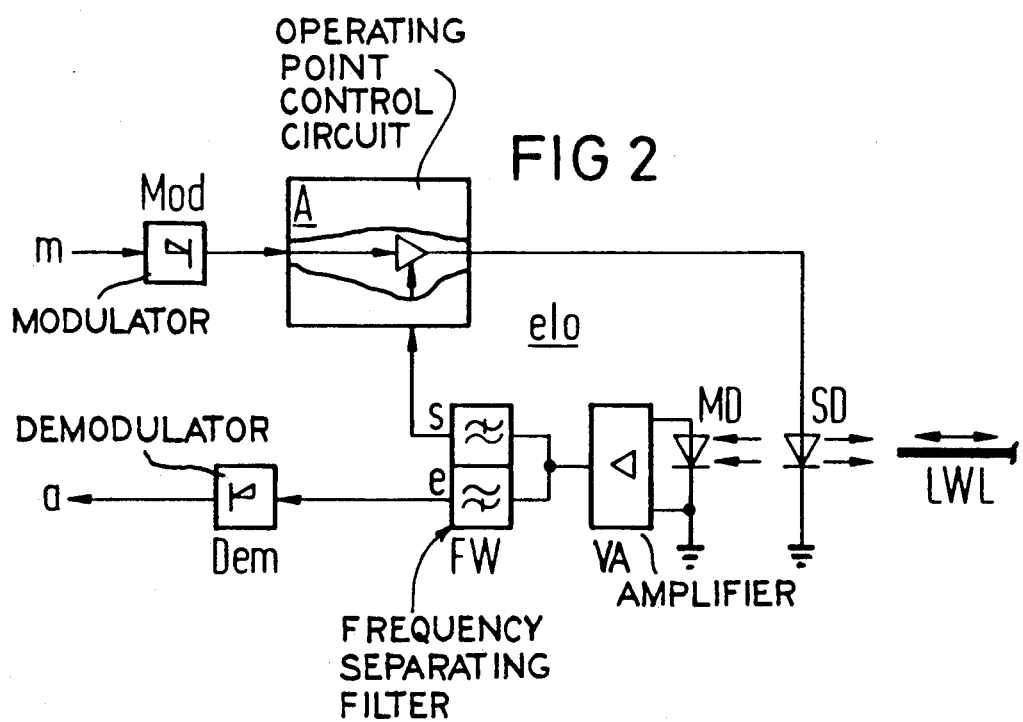
FIG 2

BIDIRECTIONAL LIGHT WAVEGUIDE TELECOMMUNICATION SYSTEM

BACKGROUND OF THE INVENTION

1. Field of the Invention

The present invention relates to a bidirectional light waveguide telecommunication system and more particularly to such a system which employs a plurality of telecommunication equipment that each comprise a combined opto-electrical receiving/electro-optic transmitting module including a laser circuit which is provided with a monitor photodiode which is used for the dual purpose of acting as a receiver and as a monitor utilized for controlling the operating point of the laser diode by way of a frequency-separating filter connected to the monitor diode which is connected to a demodulator for the received signals and a control circuit for controlling the operating point of the laser diode.

2. Description of the Prior Art

Recent developments in telecommunications technology have lead to light waveguide telecommunication systems wherein the light waveguides can be respectively utilized in both transmission directions. (In this connection, one is referred to Geisler, Beaven and Boutruche, "Optical Fibers", EPO Applied Technologies Series Vol. 5, 1986, pp. 552–586), namely in isopositional wavelength operation upon employment of, for example, direction-separating filters constructed with a partially-reflecting mirror or an (integrated optical) directional coupler (see Soejima, Yamashita and Kuwahara, Zurich Seminar '86 Conf. Paper B3, pp. B3.1–B3.8, Section 1 in Table 1), or in wavelength separation mode, i.e. in what is referred to as bidirectional wavelength multiplex (WDM-Wavelength Division Multiplex) upon utilization of appropriate wavelength filters (Zurich Seminar '86 Conf., Paper B3, pp. B3.1–B3.8, Section 3 in Table 1), in that light waves having a shorter wavelength are employed for the signal transmission via (preferably monomode) optical fibers in the one transmission direction and light waves having a longer wavelength are employed for the signal transmission in the other transmission direction. In both instances, appropriate optical separating filter modules are to be provided at the two ends of the light wave guide, these modules respectively effecting a separate light-guiding connection from the light waveguide to the respective opto-electric transducer and from the respective electro-optical transducer to the light waveguide. Direction-separating filters can also be provided in combination with a time separation mode (Zurich Seminar '86 Conf., supra, Section 4.1 in Table 1), whereas, conversely, no additional direction-separating filters need be provided given the time separation mode when the light-emitting diode or, respectively, a monitor photodiode provided for controlling the operating point thereof is also utilized as a receiving diode (Zurich, Seminar '86 Conf., supra, Section 4.3 in Table 1; German published application 38 22 803 A1, published May 3, 1989).

The introduction of new telecommunication systems having light waveguide (LWG) line trunks or central office lines is quite generally dependent on the type and scope of the telecommunication infrastructures already existing, together with the telecommunication services offered therein, and on the demand for new broadband communication services. The potentially-greatest volume of connections is thereby envisioned in the domain of private households; this potential for connections, however, will not be reflected in an effective demand for connections without correspondingly-low costs of a broadband subscriber connection.

It has already been provided (European Patent Application 89 117 968.1) in this context in a bidirectional light waveguide telecommunication system for wavelength division duplex (bidirectional WDM) between a central telecommunication location and a plurality of decentralized telecommunication locations, particularly having a passive LWG bus network extending between a switching center and a plurality of subscriber locations, that an electro-optical transmission element and an opto-electric transmission reception element that are designed for wavelength division multiplex are provided only the central telecommunication location, whereas a combined opto-electric receiving/electro-optic transmission module that is free of wavelength filters, works in the time separation mode and is designed for the emission of light having a wavelength for whose reception the central telecommunication location is equipped is respectively provided in the decentralized telecommunication locations, this combined module being formed with a laser module provided with a monitor photodiode which is utilized as a receiving diode in alternation with its monitoring function. Due to the signal running time and dependent on the burst data rate and the burst length, however, the distance that can be bridged in a time separation mode is fundamentally limited.

SUMMARY OF THE INVENTION

The object of the present invention, therefore is to avoid such a limitation and further disadvantages of a time separation mode (such as, for example, the increased expense for intermediate storing and system control combined with an additional signal running time that is inadmissible in many instances) for a bidirectional LWG telecommunication system having a plurality of telecommunication equipment that respectively comprise a combined opto-electrical receiving/electro-optical transmitting module having a laser module provided with a monitor photodiode which is also utilized as a receiving diode in addition to be utilized for controlling the operating point of the laser diode.

The above object is achieved, according to the present invention in an LWG telecommunication network in which the telecommunication equipment work in the frequency division duplex mode in that a modulation circuit preceding the laser transmission diode converts the electrical transmission signal into a frequency band other than the frequency band occupied by the electrical receiving signal and a frequency-separating filter following the monitor diode has its output for signals of the received signal frequency band leading to a demodulation circuit for the received signal and has its output for signals of the transmission signal frequency band leading to a control circuit for the operating point of the laser transmission diode.

In a LWG telecommunication system of the type set forth above, the present invention yields the advantage of enabling duplex traffic even while avoiding both an involved wavelength division duplex mode as well as a time separation mode without having to respectively provide a separate receiving diode having an optical splitter and the appertaining fiber couplings for that purpose.

BRIEF DESCRIPTION OF THE DRAWING

Other objects, features and advantages of the invention, its organization, construction and operation will be best understood from the following detailed description, taken in conjunction with the accompanying drawings, on which:

FIG. 1 is a schematic illustration of a laser module provided with a monitor photodiode and located within a LWG telecommunication equipment;

FIG. 2 is a circuit representation of an exemplary embodiment of a combined opto-electrical receiving-/electro-optical transmitting module of the present invention formed with such a laser module.

DESCRIPTION OF THE PREFERRED EMBODIMENTS

Figure 3:
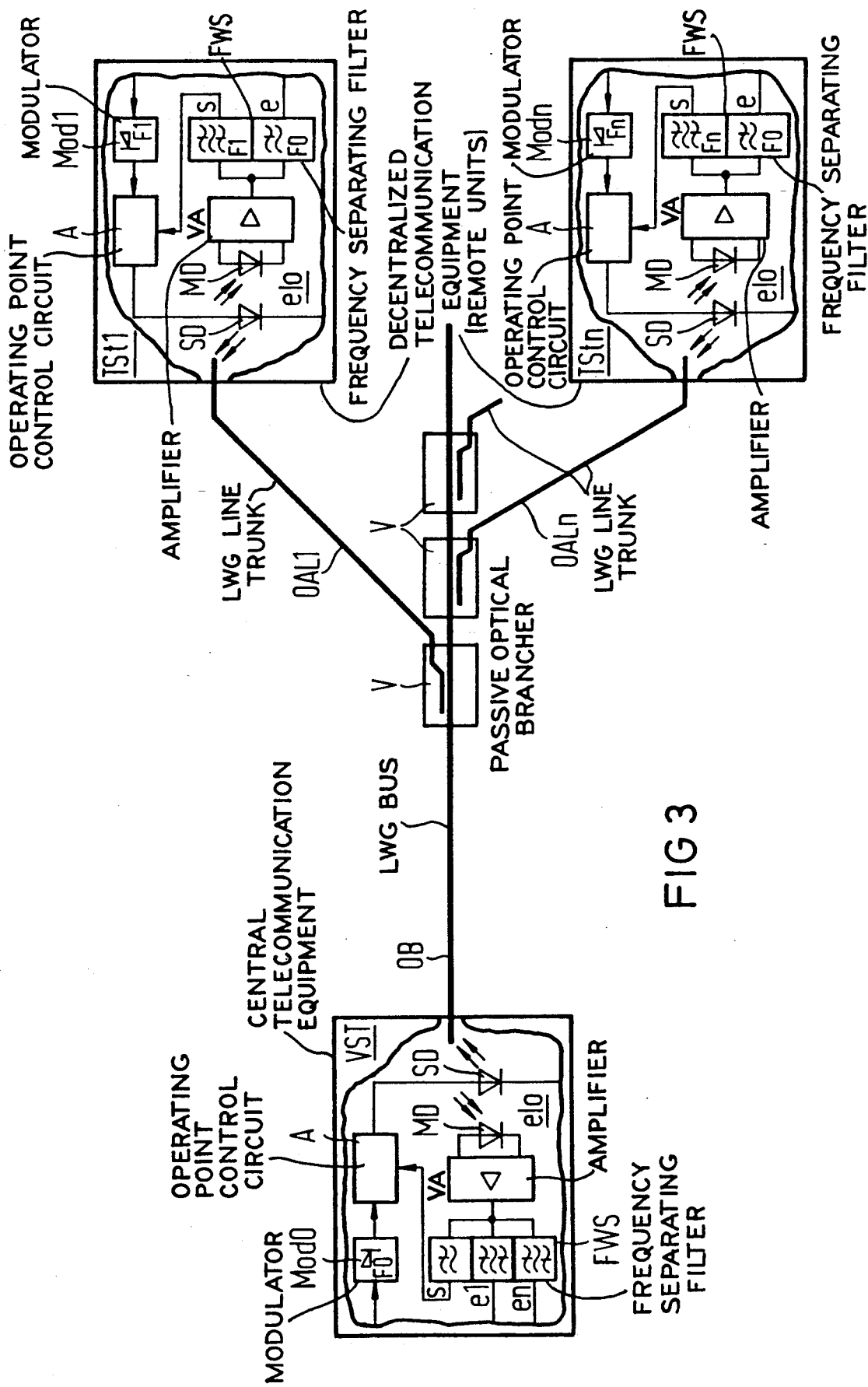
FIG. 3 is a schematic representation of a passive optical telecommunication system having a plurality of telecommunication equipment constructed and operating in accordance with the present invention.

Referring to FIG. 1, a LWG telecommunication equipment TSt is illustrated that is connected to a light waveguide LWL and that comprises a laser module M which is provided with a laser transmitting diode SD and with a monitor photodiode MD as disclosed, for example, in the publication Telcom Report Vol. 10, 1987, Special "Multiplex-und Leitungseinrichtungen, pp. 146-150, FIG. 4. The laser transmission diode SD thereby converts electrical transmission signals into optical signals to be transmitted away from the telecommunication equipment TSt via the light waveguide LWL. In addition to be employed for controlling the operating point for the laser transmission diode SD, here the monitor diode MD is also utilized as a receiving diode that converts optical signals transmitted via the light waveguide LWL to the telecommunication equipment TSt into electrical received signals. With its two photoelectrical diodes SD, MD, the laser module M (FIG. 1) is thereby a portion of combined optoelectrical receiving/electro-optical transmitting module e|o as outlined in terms of further circuit-oriented details in FIG. 2 as an example.

According to FIG. 2, the optical received signal transmitted via the lightwave LWL to the opto-electrical receiving/electro-optical transmitting module e|o, just like a portion of the optical transmission signal transmitted by the laser transmission diode SD and to be transmitted from the opto-electrical receiving/electro-optical transmitting module e|o via the light waveguide LWL, proceeds to the monitor diode MD where the optical signals are converted into corresponding electrical signals. By way of a receiving amplifier V, the monitor diode MD is followed by a frequency separating filter FW that has one output e for the electrical reception signal leading to a received signal demodulation circuit Dem whose output is assumed to form the electrical output a of the opto-electrical receiving/electro-optical transmitting module e|o. The frequency separating filter FW is thereby constructed such that it is just capable of transmitting the frequency band occupied by the modulated electrical reception signal to its output e.

The frequency separating filter FW has a second output s leading to a control circuit A for the operating point of the laser transmitting diode SD with which the light current emanating from the laser transmitting diode SD is controlled, as is known per se; this therefore need not be set forth in greater detail herein.

The frequency separating filter FW, that can be fashioned as a simple high-pass/low-pass circuit, is capable of transmitting to this output s in a frequency band other than the frequency band occupied by the modulated electrical reception signal, namely in a frequency band that is occupied by the electrical transmission signal supplied to the laser transmitting diode SD. In such a frequency band, other than the frequency band occupied by the electrical reception signal, in particular, the electrical transmission signal is converted in a modulator Mod preceding the laser transmitting diode SD, via the control circuit A for the operating point thereof in the example. The input of the modulator Mod is assumed to form the electrical input m of the opto-electrical receiving/electro-optical transmitting module e|o. The modulation can thereby be undertaken in such a manner that is standard in line communications or radio relay systems, for example in the form of an amplitude modulation, in the form of a frequency or phase shift keying, or according to some other, potentially multi-stage modulation method, and such methods and the details thereof are not necessary to be set forth herein in that the same are well-known in the art.

The desired frequency separation of the (electrical) reception signal and the (electrical) transmitting signal is therefore achieved in the telecommunication equipment TSt (FIG. 1) that contains the opto-electrical receiving/electro-optical transmitting module e|o (FIG. 2), so that the telecommunication equipment TSt can implement duplex traffic via the light waveguide LWL. Without this being shown in greater detail on the drawings, the light waveguide LWL terminated at its one end with the telecommunication equipment TSt (FIG. 1) can be terminated at its other end with a corresponding telecommunication equipment, so that the bidirectional LWG telecommunication system then has the form of what is referred to as an optical link. The present invention, however, is not limited to such a bidirectional LWG telecommunication system; on the contrary, for example, it is also possible that the telecommunication equipment TSt (FIG. 10 and the light waveguide LWL also belong to an optical local area network (LAN) or that the telecommunication location TSt is a matter of a decentralized equipment (subscriber location or what is referred to as a distant unit that combines a plurality of subscriber locations) of a passive optical telecommunication system in which a respective plurality of such decentralized equipment are each respectively connected via a separate light waveguide line (central office line) to a light waveguide connection of a central equipment, particularly represented by a switching center, or to an optical brancher that is connected to a common light waveguide terminal of the central equipment via a light waveguide bus, either directly or by way of at least one further optical brancher, as outlined in FIG. 3.

In the bidirectional LWG telecommunication system schematically illustrated in FIG. 3, a passive (preferably monomode) LWG bus network extends between a central telecommunication equipment VST that, for example, can involve a switching center and a plurality of decentralized telecommunication equipment TSt1, . . . , TStn. Such decentralized telecommunication equipment can be subscriber locations, or can also be what are referred to as remote units, i.e. interface equipment provided with an electro-optical/opto-electrical transducer that, with the assistance of a multiplexer/demultiplexer that lies at the electrical side of the transducer and that is not shown in further detail in FIG. 3, are capable of combining or, respectively, splitting up to 32 integrated subscriber digital network (ISDN) B channels, as warranted.

In this LWG telecommunication system, the decentralized equipment TSt are connected via a single fiber LWG bus OB to a common LWG multiplex terminal of the central telecommunication equipment VSt. It is assumed that the LWG line trunks (or central office lines) OAL1, . . . OALn belonging to the individual decentralized equipment TSt1, . . . , TStn be thereby connected to the appertaining LWG bus OB via passive optical branches V, namely either directly or via further branches of this type, said branches, for example, being accommodated in cable branching housings. For example, tandem mixers or optical directional couplers can thereby be employed as optical branchers. It is also possible to provide a common optical brancher for a plurality of light waveguide trunk lines OAL, as known per se (for example, from the European patent application 0 171 080). This, therefore, need not be set forth in further detail herein.

In the telecommunication system outlined in FIG. 3, it is assumed that the individual telecommunication equipment TSt1, . . . , TStn and VSt are each respectively provided with an opto-electrical receiving/electro-optical transmitting module e|o, as was already set forth in principle with reference to FIG. 2. A respective laser transmitting diode SD and a monitor diode MD, as utilized as a receiving diode at the same time, are therefore respectively provided, this being followed via a receiving amplifier VA, by a frequency separating filter circuit FWS that has an output s for signals of the respective transmission signal frequency band leading to the control circuit A for the operating point of the laser transmitting diode SD, and that has an output e for signals of the respective receiving signal frequency band respectively followed by a demodulation circuit (not shown in FIG. 3, see FIG. 2) for the appertaining received signal.

A frequency division duplex mode is provided as follows for separating the directions in the telecommunication system illustrated in FIG. 3:

For signal transmission in the downstream direction, i.e. from the central telecommunication location VSt to the decentralized telecommunication locations TSt1, . . . TStn, the modulation circuit Mod0 that precedes the laser transmitting diode SD of the central telecommunication location VST converts the electrical transmission signal into a frequency band F0 whose signals respectively proceed to the frequency separating filter output e in the decentralized telecommunication locations TSt1, . . . , TStn and, therefore, proceed to the respective following demodulator.

In the opposite transmission direction it is assumed that the modulators Mod1, . . . Modn of the decentralized telecommunication equipment TSt1, . . . , TStn convert the respective electrical transmission signal into a frequency band F1, . . . , Fn respectively individually associated to the telecommunication equipment with a corresponding plurality of frequency bands that each respectively differ from the aforementioned frequency band F0 that is occupied by the respective electrical reception signal in all decentralized telecommunication equipment TSt1, . . . , TStn in the same manner. In the central telecommunication equipment VST, the monitor diode MD is then not only followed by a simple frequency separating filter having two outputs, but is also followed by a frequency separating filter FWS` having a corresponding plurality of outputs e1, . . . en for signals of the mentioned frequency bands F1, . . . Fn that are individually associated to the remote telecommunication equipment. The outputs e1, . . . , en each respectively lead to a demodulator (not shown in FIG. 3, but of the same type illustrated in FIG. 2, allocated to the respective frequency band for the reception signal resulting from the appertaining, decentralized telecommunication equipment. The output s of the frequency separating filter for the signals of the transmission signal frequency band F0 of the centralized telecommunication equipment VSt, in turn, leads to the control circuit A thereof for the operating point of its laser transmitting diode SD. One therefore not only obtains the desired frequency-division duplex of signals transmitted in the downstream direction, on the one hand, and signals transmitted in the upstream direction, on the other hand, but rather, at the same time, an upstream transmission of signals of different decentralized equipment executed in frequency-division multiplex is also obtained at the same time, this by comparison to a time-division multiplex or, respectively, TDMA operation that is also inherently possible, requiring no synchronization expense or, respectively, delay expense for observing prescribed time slots.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A bidirectional light waveguide transmission system comprising:
    a plurality of telecommunication stations each optically coupled to a respective light waveguide line, each of said telecommunication stations comprising
    a modulator for receiving an input information signal and an output, said modulator operable to convert the input information signal into transmission signals in a respective transmission frequency band;
    a laser diode coupled to a respective light waveguide line for transmitting the converted information signal;
    a control circuit connected between said modulator and said laser diode for setting the operating point of said laser diode in response to a control signal,
    a monitor diode optically coupled to the respective light waveguide line and operable to convert light signals received from the respective light waveguide line into corresponding electrical signals in the transmission frequency band and in a respective receiving frequency band,
    filter means including first and second outputs and connected to said monitor diode for separating the frequency bands of received optical signals into an electrical information signal at said first output and a control signal at said second output, said second output connected to said control circuit for setting the operating point of said laser diode, and a demodulator connected to said first output of said filter means for converting the electrical information signal into an output signal.

2. The light waveguide telecommunication system of claim 1, and further comprising:
a central telecommunication station comprising
a laser diode coupled to said light waveguide bus and operating in a transmission band;
a control circuit connected to said further laser diode for setting the operating point thereof,
a modulator including an input for receiving information signals and an output connected via said control circuit to said laser diode,
a monitor diode optically coupled to said light waveguide bus and operable to convert light signals received from said laser transmitting diodes of said telecommunication equipment,
filter means connected to said further monitor diode for separating the received respective transmission frequency bands of said laser diodes of said telecommunication stations, said filter means including a first output connected to said control circuit for providing a control signal thereto for setting the operating point of said laser diode, and a plurality of second outputs each carrying signals in the individual transmission frequency bands, and
a plurality of demodulators each connected to a respective second output of said filter means.

* * * * *